UNITED STATES PATENT OFFICE.

EDWARD C. EKSTRÖMER AND MELCHER EKSTRÖMER, OF BOSTON, MASSACHUSETTS, ASSIGNORS TO JOSEPH C. KENT, TRUSTEE, OF BOSTON, MASSACHUSETTS.

SECONDARY BATTERY.

No. 918,831.  Specification of Letters Patent.  Patented April 20, 1909.

Application filed May 13, 1907. Serial No. 373,444.

*To all whom it may concern:*

Be it known that we, EDWARD C. EKSTRÖMER and MELCHER EKSTRÖMER, subjects of the King of England and the King of Sweden, respectively, and residents of Boston, in the county of Suffolk and State of Massachusetts, have invented a new and useful Improvement in Secondary Batteries, of which the following is a specification.

Our invention relates to an improvement in the structure of the active material of a secondary battery element, whereby many of the defects found in existing batteries of this class may be overcome.

The active material of a secondary battery as ordinarily constructed consists in general of a metallic oxid, formed into a paste in any suitable manner. Such active material when in use exhibits certain working defects such as buckling, sulfating, etc. Attempts have heretofore been made to overcome these defects by producing minute interstices or cavities in the active material itself, with the end of thereby obtaining greater freedom in the passing off of gas when the battery is in operation. According to our experience, however, it has been found that such a construction has for various reasons failed to accomplish the purpose intended.

Our improvement consists broadly and primarily in imparting to a mass of active material the qualities of internal elasticity and porosity, whereby under the strain of operation internal passage-ways are furnished which facilitate the release of gas and overcome the buckling tendency, and otherwise materially increase the efficiency of the structure. The particular means which we have devised for obtaining such result consists in mixing with the active material of a secondary battery a substance which so far as we are aware, is in itself novel apart from the present application of it for the purpose described. This substance consists of an albuminoid, preferably gelatin, treated in the manner hereinafter set forth whereby a portion of the elements nitrogen and hydrogen is removed without changing the consistency and physical appearance of the albuminoid and leaving the same porous, elastic and permissive of osmosis or dialysis— in other words, converting said albuminoid into a dialyzer of high dialytic power. We have found that when the substance described is introduced into the active element of a secondary battery, the said element possesses internal elasticity and porosity and is permissive of dialysis, whereby the defects now existing in the ordinary secondary battery plate are largely, if not entirely, removed, the tendency to buckling overcome, sulfating diminished, and the efficient life of said battery materially prolonged.

We will now proceed to describe what we believe to be the best method of treating the albuminoid and also of the subsequent handling of the resultant product in the production of the improved secondary battery plate above mentioned.

While we believe that the results above described may be obtained by the treatment of albuminoid substances generally, yet we will take for the specific purpose of the present description that form of albuminoid commonly known as gelatin, which according to our preferred form of procedure we treat as follows: The gelatin is formed into a paste and then formed into a filament of relatively minute cross-section. We do not, however, desire to limit ourselves to this specific method of procedure, for the gelatin may be formed in any suitable manner into any suitable shape, provided the resultant mass be sufficiently thin. The mass is then treated with dilute sulfuric acid sufficiently long to permit of thorough percolation of the acid through the same. The mass thus impregnated with the sulfuric acid solution is then treated for the removal of a portion of the elements hydrogen and nitrogen, as thoroughly as practicable. We have found that a convenient and efficient means of bringing about this removal is by treating the mass with heat and water under pressure, preferably after removing the superficial acid. This may be done by placing the mass with water in a hermetically closed vessel so constructed that its contents may be raised to a high degree of heat, considerably above the boiling point of the water employed and heating the same at a temperature of about 250 degrees Fahr. for about half an hour. When the contents of the vessel, after such treatment are examined, the water will be found to contain ammonium sulfate while a portion of the elements hydrogen and nitrogen will be found to have been removed from the albuminoid, the consistency and physical appearance of which, however, have not been changed and which is now porous, elastic and highly permissive of dialysis. In order to conveniently unite the albuminoid so treated with the active material which may be selected for the formation of a secondary battery plate, the albuminoid may be comminuted and mechanically mixed with the active material of the plate prior to its formation.

The albuminoid treated as above set forth and mixed with the active material of the battery element will furnish elasticity and porosity and, being a dialyzer of high dialytic power for acid solutions, will enable the electrolyte to have free access to the interior of the plate during charging. The lead sulfate which is formed during discharge, an which is detrimental to the efficiency of the battery by preventing the complete formation or charging of the plate, is converted during charging into sulfuric acid and lead oxid. Further, the plate when formed will be elastic throughout and will be found to permit uniform self-contraction and self-expansion and free release of gas during heavy charging and discharging.

The suitable ratio of the active substance of the plate to the albuminoid substance will depend upon the output or rate of discharge of the battery and therefore may be best determined empirically or experimentally to suit the conditions of any particular case.

We are aware that heretofore it has been proposed to mix caoutchouc with the active material of a "compressed" plate of a secondary battery. However, a plate so constructed is less efficient and has a smaller discharge rate in ampere-hours per square inch of positive surface than a plate pasted with active material alone. The reason for this is that caoutchouc is a dialyzer only to a certain limited degree for a few ethereal solutions and has no dialytic power whatsoever for acid solutions, and therefore it acts merely as an adulterant when mixed with the active material of a secondary battery plate, by reducing the amount of effective active material without imparting thereto the compensating advantage of increased penetration of the acid electrolyte which is effected by mixing with said active material matter of high dialytic power for acid solutions, such for example as the modified albuminoid or gelatin described herein.

We claim:

1. An active material for a secondary battery comprising a suitable metallic oxid and an albuminoid from which a portion of the nitrogen and hydrogen has been removed, leaving the consistency and physical appearance of said albuminoid unchanged, and rendering the same elastic, porous and permissive of dialysis.

2. An active material for a secondary battery comprising a suitable metallic oxid and gelatin from which a portion of the nitrogen and hydrogen has been removed, leaving the consistency and physical appearance of said gelatin unchanged, and rendering the same elastic, porous and permissive of dialysis.

3. A secondary battery element comprising active material mixed with an albuminoid from which a portion of the nitrogen and hydrogen has been removed, leaving the consistency and physical appearance of said albuminoid unchanged and rendering the same elastic, porous, and permissive of dialysis.

4. A secondary battery element comprising active material mixed with gelatin from which a portion of the nitrogen and hydrogen has been removed, leaving the consistency and physical appearance of said gelatin unchanged and rendering the same elastic, porous, and permissive of dialysis.

5. A secondary battery element having active material containing elastic, porous matter of high dialytic power.

6. A secondary battery element having active material containing matter of high dialytic power.

7. A secondary battery element having metallic oxid containing elastic, porous matter of high dialytic power.

8. A secondary battery element having metallic oxid containing matter of high dialytic power.

9. A secondary battery element having active material containing elastic, porous matter which has high dialytic power for acid solutions.

10. A secondary battery element having active material containing matter which has high dialytic power for acid solutions.

11. A secondary battery element having metallic oxid containing elastic, porous matter which has high dialytic power for acid solutions.

12. A secondary battery element having metallic oxid containing matter which has high dialytic power for acid solutions.

In testimony whereof, we have hereunto subscribed our names this tenth day of May, 1907.

EDWARD C. EKSTRÖMER.
MELCHER EKSTRÖMER.

Witnesses:
ALEX. P. BROWNE,
GEO. K. WOODWORTH.